United States Patent
Svaldi

[15] 3,707,194
[45] Dec. 26, 1972

[54] USE OF DIVERTING AGENTS FOR INJECTION WELL STIMULATION

[72] Inventor: Marvin A. Svaldi, Morrison, Colo.

[73] Assignee: Marathon Oil Company, Findlay, Ohio

[22] Filed: July 13, 1971

[21] Appl. No.: 162,288

[52] U.S. Cl. .............................166/305 R, 166/274
[51] Int. Cl. .............................................E21b 43/25
[58] Field of Search..166/305 R, 274, 275, 284, 281, 166/282

[56] References Cited

UNITED STATES PATENTS

| | | | |
|---|---|---|---|
| 3,336,977 | 8/1967 | Amott | 166/274 |
| 3,455,393 | 7/1969 | Bradley | 166/305 R |
| 3,460,622 | 8/1969 | Davis, Jr. | 166/275 X |
| 3,470,958 | 10/1969 | Kinney | 166/305 R |
| 3,482,635 | 12/1969 | Pasini | 166/305 R |
| 3,556,221 | 1/1971 | Haws et al. | 166/305 R |
| 3,557,873 | 1/1971 | Owens | 166/274 |
| 3,568,772 | 3/1971 | Gogarty et al. | 166/274 X |
| 3,638,729 | 2/1972 | Parker | 166/275 X |
| 3,648,774 | 3/1972 | Kirk | 166/305 R |

OTHER PUBLICATIONS

Tosch et al., "Emulsion Slugs of Improved Viscosity for Oil Recovery," Marathon Oil Co. Technical Disclosure Bulletin, Vol. No. III, March, 1966, page 5.

*Primary Examiner*—Stephen J. Novosad
*Attorney*—Joseph C. Herring et al.

[57] ABSTRACT

The injectivity profile of an injection well in fluid communication with an oil-bearing, heterogeneous formation, is improved by incorporating a diverting agent into the front portion of a micellar solution or by intermittently injecting micellar solution followed by a diverting agent—the result is to stimulate the reservoir rock and to obtain a uniform injectivity profile. The total amount of micellar solution useful to stimulate the injection well is 1–500 gallons per vertical foot of oil-bearing formation. The amount of diverting agent necessary will depend upon the heterogeneity of the formation; where intermittent slugs of micellar dispersion and diverting agent are injected, the amount of diverting agent can be from about 0.1 to about 50 or more volumes per volume of injected micellar dispersion. Examples of diverting agents include aqueous and hydrocarbon solutions containing fibrous material, laminated material, glutinous material, or other like materials which tend to "block" the reservoir rock. Preferably, the diverting agent is one that is soluble in water. A third slug can be injected to solubilize the diverting agent and optionally acid can be injected after the micellar solution and diverting agent to increase the injectivity index.

9 Claims, No Drawings

USE OF DIVERTING AGENTS FOR INJECTION WELL STIMULATION

BACKGROUND OF THE INVENTION

1. Field of the Invention

This invention relates to increasing the injectivity profile of injection wells in fluid communication with a heterogeneous formation. Such is accomplished with micellar dispersions containing a diverting agent or by intermittently injecting a micellar dispersion and then a diverting agent. The micellar dispersion is comprised of hydrocarbon, surfactant, and aqueous medium. The diverting agent can be an aqueous or hydrocarbon mixture containing a solubilized or suspended material which will effectively "block" the more permeable zones within the heterogeneous formation.

2. Description of the Prior Art.

U. S. Pat. No. 3,174,546 to Flickinger teaches use of diverting agents to effect a more uniform acidizing process.

U. S. Pat. No. 3,193,007 to Kiel et al teaches controlling injectivity profiles by injecting a surfactant solution followed by a temporary plugging agent (e.g., polyvinyl acrylamide) and this in turn followed by more surfactant solution, etc.

U. S. Pat. No. 3,353,604 to Gibson et al. teaches improved stimulation by first injecting an aldehyde polymer (this is a diverting agent which is slowly soluble in water) followed by acidizing or treating fluid — thus, permeable channels are temporarily plugged to effect a more uniform stimulation of the formation.

U. S. Pat. No. 3,455,393 to Bradley teaches modifying water injection profiles by injecting an aqueous solution containing a viscosity increasing agent with incrementally increasing concentrations of the viscosity additive. U. S. Pat. No. 3,467,188 to Gogarty teaches stimulation of water injection wells with oil-external micellar dispersions. U. S. Pat. No. 3,474,865 to Gogarty et al teaches stimulation of water injection wells with water-external micellar dispersions. These stimulation techniques are especially useful to increase injectivity index in a reservoir having substantially homogeneous strata.

The stimulation of heterogeneous formations is hampered by the fact that highly permeable zones within the formation tend to "thieve" the injected fluids and thus the less permeable zones do not benefit from injected fluids. If a uniform injectivity profile can be obtained wherein the injected fluids will come in contact with substantially all of the vertical profile of the injection well, then the stimulation of heterogeneous formations can be effected.

SUMMARY OF THE INVENTION

Applicant has discovered a novel method of improving the injectivity profile of an injection well in fluid communication with a heterogeneous formation. This is accomplished by injecting either an oil-external or a water-external micellar dispersion containing a diverting agent in the front portion of the micellar dispersion or intermittently injecting a micellar dispersion and a diverting agent. The purpose of the diverting agent is to "block" or prevent subsequently injected micellar dispersion from substantially entering the higher permeable zone(s) of the reservoir, thus a more uniform injectivity profile can be obtained. A solvent to solubilize the diverting agent can be injected after the micellar dispersion and optionally acid can be injected after or with the solvent to increase the injectivity index of the injection well.

PREFERRED EMBODIMENTS OF THE INVENTION

The micellar dispersions useful with this invention are comprised of hydrocarbon, surfactant, aqueous medium, and optionally cosurfactant and/or electrolyte. Examples of such micellar dispersions are taught in U. S. Pat. Nos. 3,254,714 to Gogarty et al.; 3,275,075 to Gogarty et al.; 3,497,006 to Jones et al.; 3,506,070 and 3,506,071 to Jones. Examples of volume amounts include about 2 to about 90 percent hydrocarbon, about 5 to about 95 percent aqueous medium, at least about 4 percent surfactant, about 0.01 to about 20 percent or more of cosurfactant, and about 0.001 to about 5 percent by weight of electrolyte. The hydrocarbon can be crude oil, a partially refined fraction of crude oil (e.g., naphthas, gasoline, kerosene, etc.), a refined fraction of crude oil (pentane, butane, decane, etc.) or a synthetic hydrocarbon (e.g., a halogenated hydrocarbon), etc. The surfactant is preferably a petroleum sulfonate having an average equivalent weight of about 350 to about 525 and is preferably a mono-valent cation containing sulfonate. The aqueous medium can be relatively soft water or brackish water, preferably the ions within the water are compatible with the ions within the subterranean formation. The cosurfactant can be an aldehyde, alcohol, ether, ester, amine, or a like compound containing one or more like functional groups (e.g., a molecule containing an ether group and a hydroxy group, etc.) wherein the cosurfactant contains one to about 20 or more carbon atoms and preferably three to about 16 carbon atoms. The electrolyte can be a water-soluble inorganic salt, inorganic base, or inorganic acid or the organic equivalent thereof. Examples of specific components can be found in the above-enumerated patents. In addition, the micellar dispersion can contain other additives to impart desired characteristics in the formation, e.g., corrosion inhibitors, oxygen scavengers, etc.

The heterogeneous formations useful with this invention include those formations having two or more zones of substantially differing permeabilities and/or differing fluid transmissibilities. Transmissibility is defined as the product of the effective permeability (to the flow of a particular fluid) and the vertical thickness of the permeable zone divided by viscosity of the fluid. These differing permeabilities and/or zonal fluid transmissibilities are generally due to differences in single phase permeabilities and/or fluid saturations. Where a stimulation fluid is injected into such a formation, the fluid tends to enter the zone having the greatest transmissibility, thus the fluid is "thieved" and the lesser transmissive zones do not "see" the fluid.

From about 1 to about 500 gallons per vertical foot of oil-bearing formation of the micellar dispersion is normally sufficient to stimulate the formation. Preferably about 20 to about 250 gallons per vertical foot is useful. If sequential injection of the micellar dispersion and the diverting agent is used, then each volume of the micellar dispersion can be within the range of about 1 to about 500 gallons per vertical foot of oil-bearing formation.

The diverting agent can be incorporated into the micellar dispersion or it can be a separate slug intermittently injected before and after the micellar dispersion. Examples of diverting agents include those agents which will effectively reduce the mobility of an aqueous, hydrocarbon or micellar dispersion medium or which will effectively "block" the reservoir rock (i.e., formation) from substantially receiving micellar dispersion. Examples of such agents include partially hydrolyzed, high molecular weight acrylamides, polysaccharides, polyethylene oxides, carboxymethylcellulose, carboxyvinylpolymers, and like materials. Also, the diverting agent can be a fibrous material, e.g., pliable, stringy, materials which tend to entangle or net in or over a crevice; granular material, e.g., a substantial rigid material which tends to bridge against itself in a crevice without being substantially distorted; and/or a laminated material, e.g., materials formed of thin sheets or flakes, etc. The size of the diverting agent preferably varies over a wide range so that an impermeable bridge rather than a filter is formed in the pores of the very permeable zones. Also, the diverting agent can be rock salt, wax such as flaked or granulated beeswax, carnauba wax, microcrystalline hydrocarbon wax, and other natural and synthetic polymers. Also, fats and hardened oils, including hydrogenated oils (e.g., animal oils, soybean oil, cottonseed oil, and like oils) are useful. Especially useful are coal tar derivatives which are preferably solid at substantially ambient temperature. In addition, synthetic diverting agents such as spherical balls, or " sealer balls" having a pliable veneer are especially useful in a cased well—the balls have a sufficiently larger diameter than the perforations within the cased well and tend to plug the perforations.

The diverting agent is preferably dispersed in a carrier liquid or the micellar dispersion. The carrier liquid can be substantially aqueous or substantially hydrocarbon. Preferably it is aqueous since a hydrocarbon carrier liquid may increase the oil saturation in the immediate vicinity of the well bore and thus reduce the permeability of the formation to the flow of water. Also, it is preferred that the carrier liquid be capable of suspending or keeping in suspension the diverting agent with a minimum of settling or separation. In addition, the carrier liquid is preferably compatible with the formation fluids and the ions within the subterranean formation. Examples of carrier fluids include water, hydrocarbon (e.g., crude oil, partially refined fractions of crude oil, etc.) and micellar dispersions. Where the carrier liquid is substantially hydrocarbon, the preferred diverting agents include high molecular weight metallic soaps, polypropylene, polybutenes, and any compatible high molecular weight polymer which tends to "plug" the formation. Examples of diverting agents preferred with aqueous carrier fluids include partially hydrolyzed high molecular weight polyacrylamides, polysaccharides, carboxymethylcellulose, carboxyvinylpolymers, polyethylene oxides, like materials, and combinations thereof.

Where the well is cased, i.e., perforations are present in the casing to permit fluid communication with the formation, the diverting agent can be "sealer balls." The sealer balls preferably have an average diameter greater than the perforations, such permits the sealer balls to seal the perforations. Examples of sealer balls include those made of nylon, rubber, rubber coated balls, neoprene, plastic, or like materials. The sealer balls substantially conform to the shape of the perforations and thus seal off that portion of the formation in communication through the perforation. The sealer balls are removed uphole or permitted to fall into a basket at the terminable end of the casing before normal operation of the injection well is resumed.

After the diverting agent is injected into the formation, a solvent to solubilize the diverting agent can be injected to substantially remove the diverting agent from the immediate vicinity of the well bore. For example, sodium hypochlorite, hydrazine, or like material is useful wherein the diverting agent is a partially hydrolyzed, high molecular weight polyacrylamide—these particular solvents tend to remove polyacrylamide that has become adsorbed onto the reservoir rock and thus increase the effective permeability of the formation to the flow of injection fluid. Of course, the particular solvent to be injected should have a capability of solubilizing the previously injected diverting agent. Thus, the particular diverting agent will dictate the particular solvent to be injected.

Also, an acidic solution can be injected after the micellar dispersion to further increase the injectivity index of the injection well. Examples of useful acids include aqueous solutions of hydrochloric and sulfuric acids. The acids can have other additives incorporated therein to impart desired characteristics; these additives are known in the art. Also, the particular chosen acid is preferably compatible with the reservoir rock.

The diverting agent can be incorporated within the micellar dispersion. The amount of diverting agent will be directly dependent upon the degree of heterogeneity in the formation. For example, where the formation is composed of a lesser and a higher permeability zones, then only one "slug" of diverting agent is necessary to "block" the higher permeability zone. However, where there are more than two substantially differing permeabilities within the formation, then more than two separate slugs of diverting agents are desired. For example, an initial slug of micellar dispersion can be injected followed by a slug of diverting agent and then followed by another slug of micellar dispersion and this, in turn, followed by a slug of diverting agent; such can be repeated until the desired injectivity profile is obtained. Of course, the number of differing permeabilities will dictate the number of diverting agent slugs to be injected. Where the diverting agent is to be suspended in the micellar dispersion, then the diverting agent can be intermittently injected while the micellar dispersion is injected. For example, 100 to 100,000 ppm of a partially hydrolyzed polyacrylamide can be intermittently mixed with an oil-external micellar dispersion and injected as taught herein.

When acid is injected after the micellar dispersion and the diverting agent, examples of volume amounts include 1 to about 500 gallons, preferably 20 to about 250 gallons of acid per vertical foot of oil-bearing formation. Where the micellar dispersion is used to suspend the diverting agent, it may be desirable to inject a slug of water between the micellar dispersion and the acid slug; examples of volume amounts of water include from about 0.1 to about 50 volumes of water per volume of injected micellar dispersion. The water is desired to insulate the micellar dispersion from the subsequently injected acid.

After the micellar dispersion and diverting agent is injected, water can be injected into the injection well and normal operation resumed. Increased injectivity indexes are then realized. It may be desired to treat the injection well by this process at designated intervals, e.g., every two months; however, such a treatment will depend upon the particular reservoir and the desired injectivity indexes.

The following examples are presented to teach specific working embodiments of the invention. Unless otherwise specified, all percents are based on volume.

EXAMPLE I

An injection well in fluid communication with a heterogeneous formation 50 feet thick and having three substantially differing permeabilities is treated by injecting a total of 12,500 gallons of an oil-external micellar dispersion comprised of 70 percent aqueous medium, 10 percent ammonium petroleum sulfonate, 19 percent of hydrocarbon (straight run gasoline) and about 1 percent of n-hexanol. First there is subjected 2,500 gallons of the micellar dispersion, then 1,000 gallons of the micellar dispersion containing 1,000 ppm of Dow Pusher 700 (a partially hydrolyzed, high molecular weight polyacrylamide marketed by Dow Chemical Co., Midland, Michigan) is injected. The pressure gauge of the injection well indicates a pressure increase, thus, the most permeable zone is "blocked" by the 1,000 gallon slug. Thereafter, 4,000 gallons of the micellar dispersion are injected; this slug flows into the second most permeable zone. Thereafter, 1,000 gallons of the micellar dispersion are injected containing 1,000 ppm of the Dow Pusher 700 polymer. Again, a pressure increase is realized. Thereafter, the residue of the micellar dispersion, i.e. 4,000 gallons, is injected through the injection well. Water is then injected into the injection well. An improved injectivity profile is realized as compared to the original injectivity profile, i.e., more effective stimulation is obtained.

EXAMPLE II

The procedure of Example I is repeated except the micellar dispersion is a water-external micellar dispersion containing 64.6 percent water (contains 0.979 weight percent sodium hydroxide), 27.4 percent crude oil (viscosity about 7 cp at ambient temperature), 6.7 percent of an ammonium petroleum sulfonate (average equivalent weight about 420), 0.7 percent isopropanol, and 0.6 percent nonyl phenol. An improved injectivity profile is realized.

EXAMPLE III

An injectivity well having a perforated casing within the well bore in fluid communication with a formation about 20 feet thick is treated. The formation is characteristic of two differing transmissibilities, that is, a lesser and a higher permeable zone. This well is treated by first injecting 1,500 gallons of a micellar dispersion defined in Example I. Thereafter, there is injected 500 gallons of the same micellar dispersion containing sealer balls, the number sufficient to seal 35 percent of the perforations within the casing. Thereafter, 2,000 gallons of the micellar dispersion are injected into the formation. Water is then injected. An improved injectivity profile is realized as compared to the original injectivity profile.

It is not intended that the invention be limited by the specifics taught about. Rather, all equivalents obvious to those skilled in the art are intended to be equated within the scope of the invention as defined within the specification and appended claims.

What is claimed is:

1. A process of improving the injectivity profile of an injection well in fluid communication with an oil-bearing, heterogeneous formation, the heterogeneous formation having at least a lesser and a higher permeable zone(s), the process comprising injecting about 1 to about 500 gallons of a micellar dispersion per vertical foot of the oil-bearing formation into the formation and incorporating into the micellar dispersion or into a carrier liquid a sufficient amount of a diverting agent to substantially "block" the more permeable zone(s) after a portion of the micellar dispersion enters the more permeable zone(s).

2. The process of claim 1 wherein a solvent to solubilize the diverting agent is injected after the micellar dispersion is injected into the formation.

3. The process of claim 1 wherein the diverting agent is a high molecular weight organic polymer.

4. The process of claim 1 wherein the diverting agent is a partially hydrolyzed, high molecular weight polyacrylamide.

5. A process for improving the injectivity profile of an injection well in fluid communication with an oil-bearing, heterogeneous formation having substantially differing permeabilities, the process comprising injecting into the formation 1 to about 500 gallons of a micellar dispersion per vertical foot of the formation, the micellar dispersion intermittently containing a high molecular weight organic polymer in sufficient amounts to substantially "block" the more permeable zones of the formation, the result being to obtain a more uniform injectivity profile.

6. The process of claim 5 wherein a solvent is injected after the micellar dispersion to substantially remove the organic polymer from the formation in the immediate vicinity of the injection well.

7. The process of claim 5 wherein the organic polymer is a partially hydrolyzed, high molecular weight polyacrylamide.

8. The process of claim 7 wherein sodium hypochlorite or hydrazine is injected after the micellar dispersion to substantially remove any of the polyacrylamide that becomes adsorbed on the reservoir rock within the immediate vicinity of the well bore.

9. The process of claim 5 wherein an aqueous acidic solution is injected after the micellar solution to further increase the injectivity index.

* * * * *